Aug. 18, 1942.  R. V. OLDHAM  2,293,305
FISHING ROD HOLDER
Filed April 14, 1941
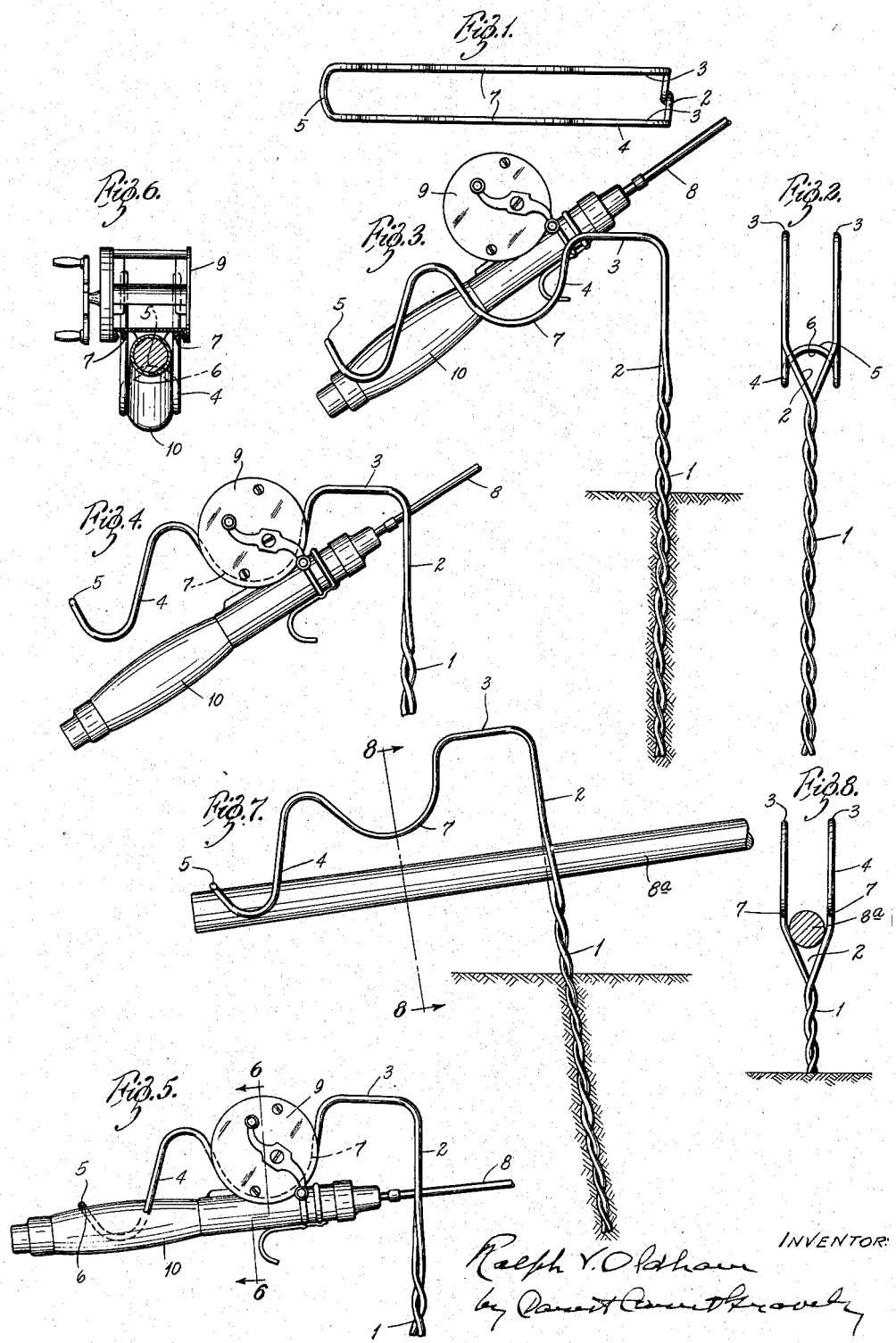
INVENTOR:
Ralph V. Oldham
HIS ATTORNEYS.

Patented Aug. 18, 1942

2,293,305

UNITED STATES PATENT OFFICE 2,293,305

FISHING ROD HOLDER

Ralph V. Oldham, Wood River, Ill.

Application April 14, 1941, Serial No. 388,404

2 Claims. (Cl. 248—38)

This invention relates to holders for fishing rods or poles. It has for its principal objects to devise a simple and economical holder of the above type that may be made of a single length of wire; that will provide adequate support for rods of different types; that will provide for quickly and easily mounting the rod in the holder and dismounting it therefrom; and that will prevent endwise movement in the holder of a rod equipped with a reel. The invention consists in the fishing rod holder and in the construction, combinations and arrangements of parts hereinafter described and claimed.

In the accompanying drawing, which forms part of this specification and wherein like symbols refer to like parts wherever they occur, Fig. 1 is a top plan view of a fishing pole holder embodying my invention, Fig. 2 is a view looking at the stake end of said holder, Figs. 3, 4 and 5 are side elevational views of said holder, showing the manner of mounting a reel equipped fishing rod therein.

Fig. 6 is a vertical transverse section on the line 6—6 in Fig. 5,

Fig. 7 is a side elevational view of the holder, showing the manner of supporting a plain fishing pole therein; and Fig. 8 is a transverse section on the line 8—8 in Fig. 7.

My fishing rod holder comprises a single length of wire having its end portions twisted or wound together to form a staff or stake 1 adapted to be inserted into the ground for bank fishing or mounted in a suitable holder or supporting bracket (not shown) for boat or pier fishing. The two portions of the wire are spread apart above the twisted portions thereof to form a rod or pole receiving fork or crotch 2 at the top of the stake 1. The two branches of the fork 2 extend upwardly and are thence extended, as at 3, in spaced substantially parallel relation on one side of the stake 1 to form an outstanding or overhanging rod or pole receiving arm 4 at the upper end of the fork. The two branches 3 of the arm 4 are connected at the free outer end thereof by a return bend portion 5 which inclines upwardly and outwardly to provide a downwardly opening arcuate rod or pole seat 6 at said end of said arm. The spaced parallel branches 3, which form the outstanding arm 4, are offset downwardly, between the upwardly opening fork 2 at one end of said arm and the downwardly opening seat 6 at the other end thereof, to provide oppositely disposed upwardly opening arcuate reel seats 7 therein.

As shown in Figs. 3 to 6, inclusive, when the holder is used for supporting a fishing rod 8 equipped with a reel 9, the stake portion 1 of the holder is inserted into the ground or a holder or supporting bracket and the butt or handle portion 10 of the rod is thrust downwardly between the spaced branches 3 of the overhanging arm 4 of the holder with the reel uppermost. The reel is then seated in the upwardly opening arcuate seats 7 in the arm 4 and the rod released, whereby the overhanging weight of the free outer end portion of the rod causes the reel to turn in said arcuate supporting seats and the butt or handle portion 10 of the rod to swing upwardly and seat itself in the downwardly opening seat 6 in the free end of said arm. With the rod and reel thus positioned in the holder, the engagement of the reel in the arcuate supporting seats 7 in the arm 4 prevents the rod from being pulled endwise from the holder, while the downwardly opening seat 6 at the free end of the outstanding arm 4 prevents downward swinging movement of the outer or free end of the rod. The rod is detached from the holder merely by swinging the rod upwardly in the bearing formed by the reel seats 7 until the butt or handle of the rod is disengaged from the downwardly opening seat and then lifting the rod out of the holder.

As shown in Fig. 7, when the holder is used for supporting a plain fishing pole 8a that is not equipped with a reel, the rod is placed within the fork 2 of the holder and seats therein. In this position of the rod, the weight of the overhanging portion thereof causes the rod to pivot in the fork and swing the handle or butt portion of the rod upwardly into the downwardly opening seat 6 provided therefor in the free end of the overhanging arm 4, thus holding the rod in proper fishing position.

The hereinbefore described fishing rod or pole holder has several important advantages. It is made from a single length of wire that is quickly and easily twisted to form the stake portion 1 of the holder and bent to form the rod supporting arm 4 thereof. The rod or pole may be readily inserted in and removed from the holder. The wire holder has sufficient resiliency or spring to set the hook at the first sharp tug on the line. When a reel equipped rod is mounted in the holder with the reel resting in the relatively deep reel seats, the rod is firmly supported and held in the holder and can be removed therefrom only by lifting the reel out of said seats.

What I claim is:

1. A fishing rod holder comprising a length of wire having its end portions twisted together to form a stake with an upstanding rod receiving fork at the upper end thereof having its branches extending in spaced relation at an angle to said stake and connected at the end remote from said fork by a return-bend adapted to provide a seat for the handle portion of said rod, the portions of the extended branches of said fork between the latter and said return-bend being shaped to provide a seat for a reel mounted on said rod.

2. A fishing rod holder comprising a single length of wire having its end portions twisted together to form a stake with an upstanding rod receiving fork at the upper end thereof having its branches extended in spaced relation at an angle to said stake and connected at the end remote from said fork by a downwardly opening return-bend portion of said wire adapted to provide a downwardly opening seat for the handle portion of said rod, the extended branches of said fork being offset downwardly between the latter and said return-bend to provide an upwardly opening arcuate seat for a reel mounted on said rod.

RALPH V. OLDHAM.